United States Patent
Lee et al.

(10) Patent No.: US 9,606,920 B2
(45) Date of Patent: Mar. 28, 2017

(54) MULTI-CPU SYSTEM AND COMPUTING SYSTEM HAVING THE SAME

(71) Applicant: SAMSUNG ELECTRONICS CO., LTD., Suwon-si, Gyeonggi-do (KR)

(72) Inventors: Hoi Jin Lee, Seoul (KR); Young Min Shin, Seoul (KR)

(73) Assignee: SAMSUNG ELECTRONICS CO., LTD., Suwon-si, Gyeonggi-Do (KR)

(*) Notice: Subject to any disclaimer, the term of this patent is extended or adjusted under 35 U.S.C. 154(b) by 0 days.

(21) Appl. No.: 14/604,832

(22) Filed: Jan. 26, 2015

(65) Prior Publication Data

US 2015/0143048 A1 May 21, 2015

Related U.S. Application Data

(63) Continuation of application No. 13/741,717, filed on Jan. 15, 2013, now Pat. No. 8,949,534.

(30) Foreign Application Priority Data

May 8, 2012 (KR) ........................ 10-2012-0048455

(51) Int. Cl.
    G06F 12/08 (2016.01)
    G06F 12/0811 (2016.01)
    G06F 12/084 (2016.01)
    G06F 1/32 (2006.01)
    G06F 12/0831 (2016.01)

(52) U.S. Cl.
    CPC ........ *G06F 12/0811* (2013.01); *G06F 1/3234* (2013.01); *G06F 1/3275* (2013.01); *G06F 12/084* (2013.01); *G06F 12/0833* (2013.01); *G06F 2212/1028* (2013.01); *G06F 2212/283* (2013.01); *G06F 2212/62* (2013.01); *Y02B 60/1225* (2013.01); *Y02B 60/1228* (2013.01); *Y02B 60/32* (2013.01)

(58) Field of Classification Search
    None
    See application file for complete search history.

(56) References Cited

U.S. PATENT DOCUMENTS

| | | | | |
|---|---|---|---|---|
| 2001/0049771 | A1* | 12/2001 | Tischler | G06F 12/121 711/133 |
| 2004/0130036 | A1* | 7/2004 | Owaki | H01L 25/0652 257/777 |
| 2006/0171239 | A1* | 8/2006 | Balasubramanian | G06F 13/1663 365/230.05 |
| 2009/0037658 | A1* | 2/2009 | Sistla | G06F 12/0831 711/119 |

(Continued)

FOREIGN PATENT DOCUMENTS

JP 2010534377 11/2010

*Primary Examiner* — Duc Doan
(74) *Attorney, Agent, or Firm* — F. Chau & Associates, LLC

(57) ABSTRACT

A multi-CPU data processing system, comprising: a multi-CPU processor, comprising: a first CPU configured with at least a first core, a first cache, and a first cache controller configured to access the first cache; and a second CPU configured with at least a second core, and a second cache controller configured to access a second cache, wherein the first cache is configured from a shared portion of the second cache.

20 Claims, 13 Drawing Sheets

(56) References Cited

U.S. PATENT DOCUMENTS

| | | | |
|---|---|---|---|
| 2009/0083493 A1* | 3/2009 | Kinter | G06F 12/0831 711/141 |
| 2011/0238925 A1 | 9/2011 | Robinson | |
| 2012/0317568 A1* | 12/2012 | Aasheim | G06F 9/45558 718/1 |
| 2013/0111121 A1* | 5/2013 | Ananthakrishnan | G06F 12/084 711/105 |

* cited by examiner

Small CPU → Big CPU Switching

Gray Color : POWER OFF
Else : POWER ON

Big CPU → Small CPU Switching

Gray Color : POWER OFF
Else : POWER ON

MULTI-CPU SYSTEM AND COMPUTING SYSTEM HAVING THE SAME

CROSS-REFERENCE TO RELATED APPLICATIONS

This application is a Continuation of U.S. patent application Ser. No. 13/741,717 filed on Jan. 15, 2013 which claims priority under 35 U.S.C. §119 to Korean Patent Application No. 10-2012-0048455 filed in the Korean Intellectual Property Office on May 8, 2012, the disclosures of which are incorporated by reference herein in their entireties.

TECHNICAL FIELD

Embodiments of the present inventive concept relate to a multi-central processing unit (CPU) system; particularly, to a multi-CPU system which includes a level-2 (L2) cache shared by two CPUs, and a computing system having the same.

DISCUSSION OF RELATED ART

As operation frequency of a CPU gets higher, power consumption of the CPU increases. Dynamic frequency and voltage scaling (DVFS) is one technique used to optimize CPU operation frequency and power consumption.

In a multi-CPU system, sharing of CPU resources, such as a cache, may increase chip density and decrease power consumption; however, the tradeoff may be in increased processes and operations, e.g., to maintain cache coherence.

For example, when a cache is shared by more than one CPU, data flushing and snooping is needed when the use of the shared cache is switched from one CPU to another CPU. The extra flushing and snooping operations may increase process latency and affect the overall performance of the multi-CPU system.

SUMMARY

According to an embodiment of the present inventive concept, a multi-CPU data processing system is provided, comprising: a multi-CPU processor, comprising: a first CPU configured with at least a first core, a first L2 cache, and a first cache controller configured to access the first L2 cache; and a second CPU configured with at least a second core, and a second cache controller configured to access a second L2 cache, wherein the first L2 cache is configured from a shared portion of the second L2 cache.

According to an embodiment of the present inventive concept, the system further includes a shared circuit configured to input data to the first L2 cache from either the first cache controller or the second cache controller based on a selection signal, wherein the shared circuit includes a multiplexer configured to select data input to the first L2 cache and a demultiplexer configured to pass data read from the first L2 cache to output to the first cache controller or the second cache controller based on the selection signal.

According to an embodiment of the present inventive concept, the system further includes a power management unit configured to output control signals to independently control the turning on and off among the first CPU, the second CPU, and the first L2 cache, wherein the power management unit is further configured to selectively switch power between the first CPU excluding the first L2 cache and the second CPU, while maintaining power on the first L2 cache.

According to an embodiment of the present inventive concept, the first L2 cache and the shared circuit are embedded in a first SoC and the first CPU excluding the first L2 cache is embedded in a second SoC.

According to an embodiment of the present inventive concept, the first CPU excluding the first L2 cache is embodied in a first power domain, the second CPU excluding the first L2 cache is embodied in a second power domain, and the first L2 cache is embodied in a third power domain, wherein each power domain is independently controllable.

According to an embodiment of the present inventive concept, the system further includes an interface block configured to interface the multi-CPU processor with a memory device, a display, and a wireless interface block.

According to an embodiment of the present inventive concept, the system is embodied in one of a smartphone, a laptop, or a tablet computer.

According to an embodiment of the present inventive concept, a multi-CPU data processing system is provided, comprising: a first CPU configured with at least a first core, a first L2 cache, and a first cache controller configured to access data from the first L2 cache; and a second CPU configured with at least a second core, and a second cache controller configured to access data from a second L2 cache, wherein the first L2 cache is configured from a shared portion of the second L2 cache, wherein the first CPU excluding the first L2 cache is embodied in a first die and the second CPU is embodied in a second die.

According to an embodiment of the present inventive concept, the system further includes a shared circuit configured to output data from the first L2 cache to the first L2 cache controller or the second L2 cache controller based on a selection signal, wherein the shared circuit is embodied within the second die, wherein control signal lines for the shared circuit include Through Silicon Vias (TSVs) connecting between the first die and the second die, and data access to/from the first L2 cache by the first CPU is made through TSVs.

According to an embodiment of the present inventive concept, the L1 cache and the L2 cache are embodied on a common substrate, and at least one address line is common to both the L1 cache and the L2 cache.

According to an embodiment of the present inventive concept, the system further includes a power management unit configured to selectively apply power to the first and the second power domains while maintaining the third power domain at power on.

According to an embodiment of the present inventive concept, a method of data processing using a multi-CPU processor is provided, comprising: accessing a first L2 cache by a first CPU via a first cache controller; and accessing a second L2 cache by a second CPU via a second cache controller, wherein the first L2 cache is configured from a shared portion of the second L2 cache.

According to an embodiment of the present inventive concept, the method includes multiplexing data input to the second L2 cache from either the first CPU or the second CPU based on a selection signal.

According to an embodiment of the present inventive concept, the method includes switching cache access operation from the first CPU to the second CPU without flushing or snooping of the first L2 cache.

According to an embodiment of the present inventive concept, the method further includes switching cache access operation from the second CPU to the first CPU and performing a flushing or snooping operation on non-shared portion of the second L2 cache.

According to an embodiment of the present inventive concept, the method further includes accessing either the L1 cache or the L2 cache via a common address line.

According to an embodiment of the present inventive concept, the method further includes interfacing the processor with a memory device, a display, and a wireless interface block.

According to an embodiment of the present inventive concept, a portable computing device is provided, comprising: a first CPU configured with at least a first core, a first L2 cache, and a first cache controller configured to access the first L2 cache; and a second CPU configured with at least a second core, and a second cache controller configured to access a second L2 cache, wherein the first L2 cache is configured from a shared portion of the second L2 cache.

According to an embodiment of the present inventive concept, the device further includes a wireless transceiver configured to transmit and receive data wirelessly.

According to an embodiment of the present inventive concept, a processor is provided, comprising: a first CPU configured with at least a first core, a first L2 cache, and a first cache controller configured to access the first L2 cache; a second CPU configured with at least a second core, and a second cache controller configured to access a second L2 cache, the second L2 cache is larger in storage capacity than the first L2 cache; a multiplexer configured to pass data to the first L2 cache from either the first core via the first cache controller or the second core via the second cache controller based on a selection signal; and a demultiplexer configured to pass data from the first L2 cache to either the first core via the first cache controller or the second core via the second cache controller based on the selection signal, wherein the first L2 cache is configured from a shared portion of the second L2 cache, and the L1 cache and the L2 cache are embodied on a common substrate.

According to an embodiment of the present inventive concept, a multi-CPU data processing system is provided, comprising: a multi-CPU processor, comprising: a first CPU configured with at least a first core, a first L2 cache, and a first cache controller configured to access the first L2 cache; a second CPU configured with at least a second core, and a second cache controller configured to access a second L2 cache, wherein the first L2 cache is configured from a shared portion of the second L2 cache; a power management unit configured to selectively supply power to either or both of the first CPU and the second CPU and the first L2 cache; and a memory controller configured to control memory access to and from the multi-CPU processor via a databus.

BRIEF DESCRIPTION OF THE DRAWINGS

These and/or other aspects of the present inventive concept will become apparent and more readily appreciated from the following description of the embodiments, taken in conjunction with the accompanying drawings of which.

DETAILED DESCRIPTION

Figure 1A:
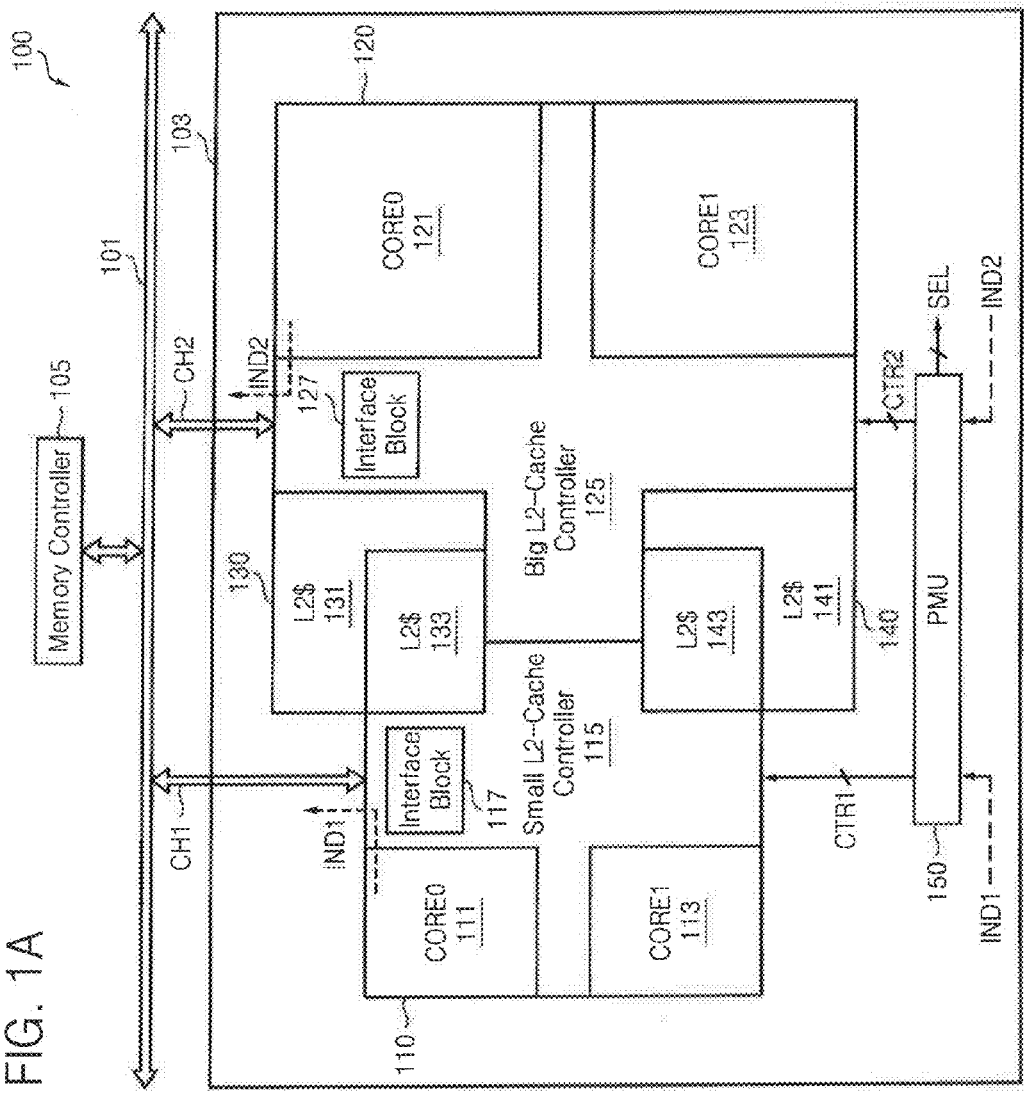
FIG. 1A is a schematic block diagram of a multi-central processing unit (CPU) system according to an example embodiment of the present inventive concept.

FIG. 1A is a schematic block diagram of a multi-central processing unit (CPU) system according to an example embodiment of the present inventive concepts.

Referring to FIG. 1A, a multi-CPU system 100 includes a system bus 101, a multi-CPU 103 and a memory controller 105. Here, the multi-CPU system 100 may be embodied in a system on chip (SoC). For example, the multi-CPU system 100 may be embodied by using a single mask.

A multi-CPU 103 may include a first CPU 110 and a second CPU 120. According to an example embodiment, the multi-CPU 103 may further include a power management unit (PMU) 150.

For convenience of explanation, the multi-CPU 103 including two CPUs 110 and 120 is illustrated in FIG. 1A; however, the present inventive concept may be applied to a multi-CPU including more than two CPUs.

The first CPU 110 may include at least one first CPU core 111 and 113 and a first level-2 (L2) cache controller 115. Accordingly, the first CPU 110 may be embodied in a multi-core CPU. The at least one first CPU core 111 and 113 may include a level-1 (L1) cache (not shown), e.g., an instruction cache and a data cache. The at least one first CPU core 111 and 113 may further include a peripheral circuit for communicating with the first level-2 (L2) cache controller 115.

The first L2 cache controller 115 may further include a first interface block 117 interfacing with a system bus 101 through a first communication channel CH1.

The second CPU 120 may include at least one second CPU core 121 and 123, a second L2 cache controller 125 and at least one L2 cache 130 and 140. Accordingly, the second CPU 120 may be embodied in a multi-core CPU. The at least one second CPU core 121 and 123 may include an L1 cache (not shown), e.g., an instruction cache and a data cache. The at least one second CPU core 121 and 123 may further include a peripheral circuit for communicating with the second L2 cache controller 125.

The second L2 cache controller 125 may include a second interface block 127 interfacing with the system bus 101 through a second communication channel CH2.

Here, the first L2 cache controller 115 and the second L2 cache controller 125 may be embodied in separate structures, operate independently, and communicate with the system bus 101 separately over communication channels CH1 and CH2.

Each of the first CPU 110 and the second CPU 120 includes a corresponding L2 cache in addition to a corresponding L1 cache. An L2 cache is a data cache and is typically larger in capacity and size than an L1 cache. For purposes of illustrating the present embodiment, the 'first' group of components such as the first CPU 110, first L2 cache controller 115, and the first L2 cache are referred to as the 'small' group—small CPU 110, small L2 cache controller 115, and so on. The 'second' group of components such as the second CPU 120, second L2 cache controller 125, and the second L2 cache are referred to as the—'big' group—big CPU 120, big L2 cache controller, and so on. The first CPU 110 includes L2 cache portions 133 and 143. The second CPU 120 includes L2 cache 130 and 140. According to an embodiment of the present inventive concept as shown in FIG. 1A, the first (small) L2 cache portions 133 and 143 are functionally shared by both the first CPU 110 and the second CPU 120. In other words, the first L2 cache portions 133 and 143 may be accessed by either the first CPU 110 or the second CPU 120. Here, 'access' means an operation necessary for a write operation or a read operation. Further, the first (small) L2 cache portions 133 and 143 is a part of the second (big) L2 cache 130 and 140. For example, the small L2 cache may be formed from a portion of the big L2 cache, e.g., the big L2 cache may be a 2 MB memory device and the small L2 cache may be formed from a 25% portion of the big L2 cache, with a 512 KB capacity, shared by the small and the big CPUs.

The non-shared portion 131 and 141 of the second L2 cache 130 and 140, (e.g., 1.5 MB of the 2 MB memory device) may be accessed only by the second CPU 120, via the second L2 cache controller 125.

The second L2 cache controller 125 may access the entire second L2 cache 130 and 140, including the shared L2 cache portions 133 and 143 and the non-shared L2 cache portions 131 and 141 at the same time. However, the shared L2 cache portions 133 and 143 may not be accessed by the first L2 cache controller 115 and the second L2 cache controller 125 at the same time.

The power management unit PMU 150 is configured to selectively apply power to the small CPU 110 and/or the big CPU 120 using control signals CTR1 and CTR2, and/or a selection signal SEL based on at least one of a first indication signal IND1 output from the first CPU 110 and a second indication signal IND2 output from the second CPU 120.

Each indication signal IND1 and IND2 may be supplied to the PMU 150 through the system bus 101. The signals SEL, CTR1, and CTR2 may comprise one or more control mode signal.

Based on the first control signals CTR1, the first CPU 110 may control a power supply and/or a reset independently by power domain. Based on the second control signals CTR2, the second CPU 120 may control a power supply and/or a rest independently by power domain.

In addition, the first CPU 110 and the second CPU 120 may control CPU scaling, i.e., switching between CPUs 110 and 120, in response to a selection signal SEL.

Although the structure as shown in FIG. 1A and operations in connection therewith have been described in connection with L2 caches, one ordinary skilled in the art can readily appreciate that the same structure and operations may be applicable to different level caches, e.g., a level-3 (L3) cache.

For example, a function block embodied in the second CPU 120 is shared by each of CPU 110 and CPU 120, e.g., an L2 cache or an L3 cache. When the function block is an L3 cache, each L2 cache controller may be replaced with an L3 cache controller.

Each CPU 110 and 120 may communicate with the memory controller 105 through each communication channel CH1 and CH2 and the system bus 101. The memory controller 105 may access a memory, e.g., a main memory, connected to a multi-CPU system.

For convenience of explanation, each element 101 and 105 is illustrated outside the multi-CPU 103 in FIG. 1A; however, each element 101 and 105 may be embodied inside the multi-CPU 103.

Figure 1B:
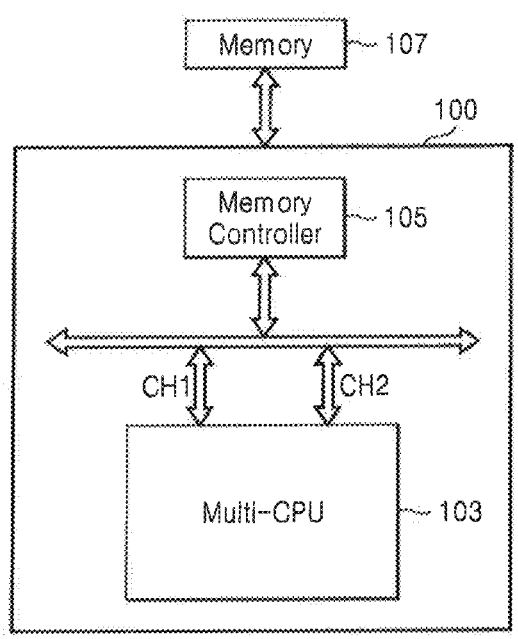
FIG. 1B is a block diagram of a computing system including the multi-CPU system of FIG. 1A.

FIG. 1B is a block diagram of a computing system including the multi-CPU system illustrated in FIG. 1A.

Referring to FIG. 1B, the computing system may include the multi-CPU system 100 and a memory 107. As described above, the memory controller 105 may control or interface data communication between the multi-CPU system 100 and the memory 107.

Figure 2:
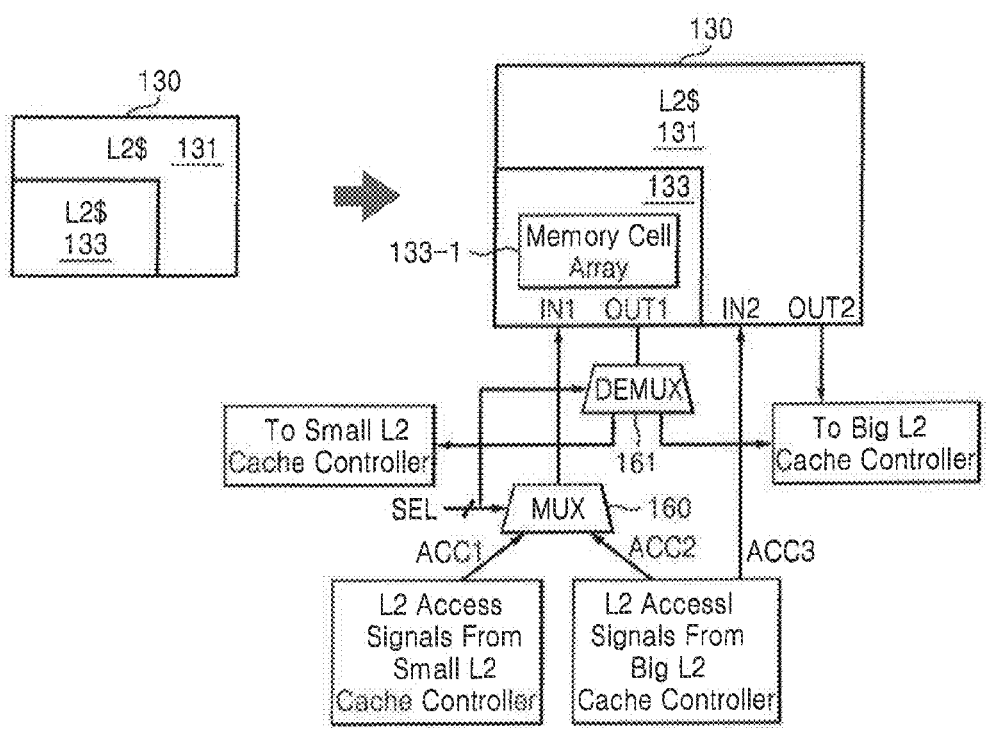
FIG. 2 is a schematic block diagram of a level-2 (L2) cache integrated to a second CPU of FIG. 1A.

FIG. 2 is a block diagram of a shared L2 cache and shared circuitry according to an embodiment of the present inventive concept.

As illustrated in FIGS. 1A and 2, an L2 cache 130 includes a dedicated region 131 which is a non-shared region and a shared region 133. In addition, an L2 cache 140 includes a dedicated region 141 and a shared region 143. Since L2 cache 130 and 140 have substantially the same structure, the descriptions of L2 cache 130 are equally applicable to L2 cache 140. Since the shared region 133 or 143 is configured from a portion of L2 cache 130 or 140, the shared region also share at least one address line of L2 cache 130 or 140.

As described above, the dedicated region 131 may be accessed only by the second L2 cache controller 125, and the shared region 133 may be accessed selectively by one of the first L2 cache controller 115 and the second L2 cache controller 125 based on a selection signal SEL.

The shared circuitry includes a first selector 160 and a second selector 161. According to one embodiment, the shared circuitry is disposed within the big CPU 120 but outside of the shared region 133. According to an alternative embodiment, the first selector 160 and the second selector 161 may be embodied inside the shared region 133. According to the present embodiment, the first selector 160 is embodied in a multiplexer and the second selector 161 is embodied in a de-multiplexer. According to an alternative embodiment, the shared circuitry may comprise the first selector 160 but not the second selector 161.

When the first L2 cache controller 115 tries to access the shared region 133, the first selector 160 transmits first access signals ACC1 output from the first L2 cache controller 115 to an input port IN1 of the shared region 133, in response to a selection signal SEL.

For a write operation by the first (small) group, the first L2 cache controller 115 writes data in the shared region 133, the first access signals ACC1 (e.g., data and control signals necessary for writing the data in a memory cell array 133-1) are transmitted to the first input port IN1 through the first selector 160.

For a read operation by the first group, the first L2 cache controller 115 reads data stored in the shared region 133, the first access signals ACC1 (e.g., control signals necessary for reading the data from the memory cell array 133-1) are transmitted to the first input port IN1 through the first selector 160 and data output from a first output port OUT1 of the shared region 133 are transmitted to the first L2 cache controller 115 through the second selector 161.

In an embodiment that does not include the second selector 161, data output from the first output port OUT1 may be transmitted directly to the first L2 cache controller 115.

For access to the shared region 133 by the second (big) group, e.g., L2 cache controller 125, the first selector 160 transmits second access signals ACC2 output from the second L2 cache controller 125 to the first input port IN1 in response to a selection signal SEL.

For example, when the second L2 cache controller 125 writes data in the shared region 133, the second access signals ACC2 (e.g., data and control signals necessary for writing the data in the memory cell array 133-1) are transmitted to the first input port IN1 through the first selector 160.

When the second L2 cache controller 125 reads data stored in the shared region 133, the second access signals ACC2 (e.g., control signals necessary for reading the data from the memory cell array 133-1) are transmitted to the first input port IN1 through the second selector 161, and data output through the first output port OUT1 are transmitted to the second L2 cache controller 125 through the second selector 161.

In an embodiment that does not include the second selector 161, data output from the first output port OUT1 may be transmitted directly to the second L2 cache controller 125.

When the second L2 cache controller 125 writes data in the dedicated region 131, third access signals ACC3 output from the second L2 cache controller 125 (e.g., data and control signals necessary for writing the data in the memory cell array 133-1) are input to a second input port IN2 of the dedicated region 131.

When the second L2 cache controller 125 reads data stored in the dedicated region 131, the third access signals ACC3 (e.g., control signals necessary for reading the data from the memory cell array 133-1) are transmitted directly to the second input port IN2, and data output through the second output port OUT2 of the dedicated region 131 are transmitted directly to the second L2 cache controller 125.

It can be seen that the shared circuitry provides a structure which prevents erroneous data access to/from the shared L2 cache by either the small or the big L2 cache controllers.

Figure 3:
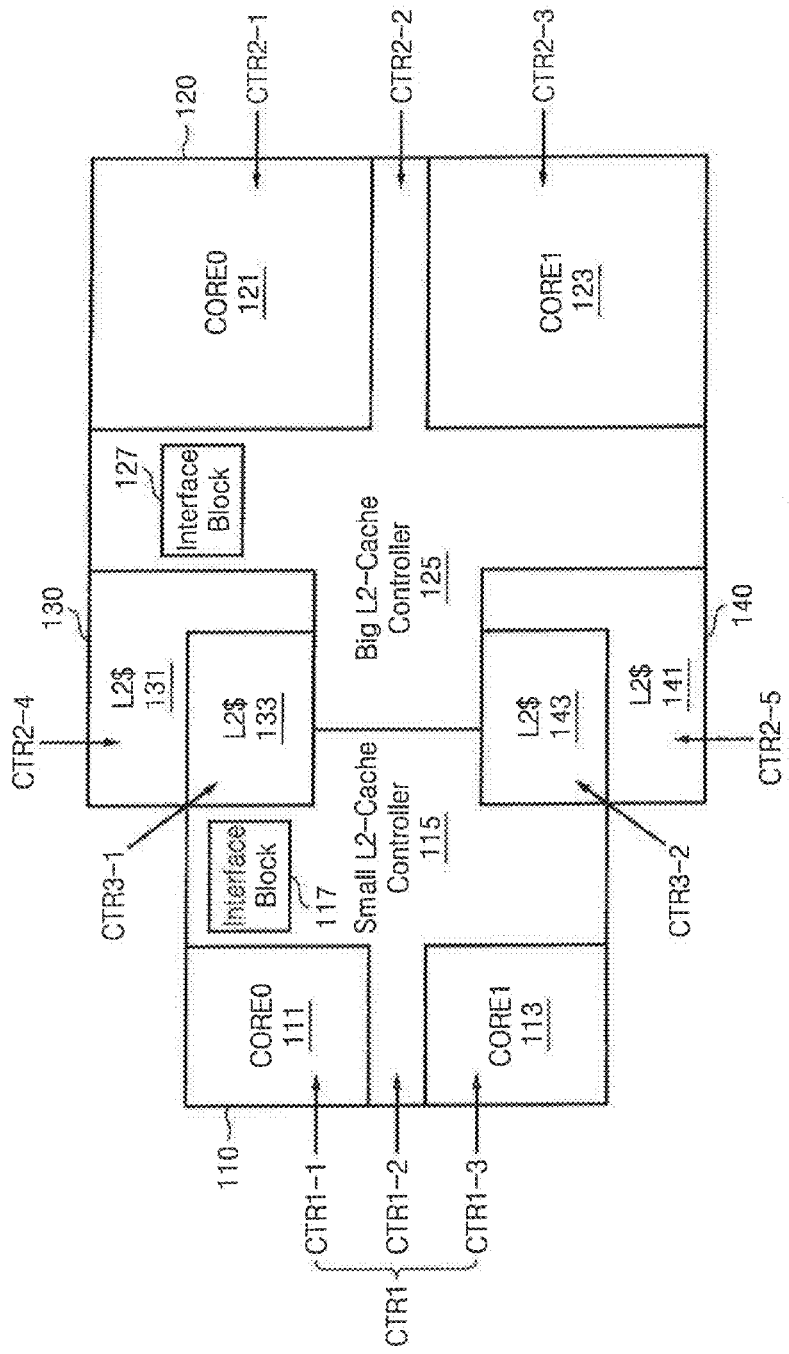
FIG. 3 is a block diagram illustrating power domains of the multi-CPU of FIG. 1A.

FIG. 3 is a block diagram of the multi-CPU of FIG. 1 used in connection with illustrating allocation and control of power domains. Referring to FIGS. 1 and 3, the first CPU 110 includes power domains 111, 113 and 115. Each of first control signals CTR1-1 to CTR1-3 (collectively, 'CTR1') is supplied to each of the power domains 111, 113 and 115.

According to each of the first control signals CTR1-1, CTR1-2 and CTR1-3, a power supplied to each of the power domains 111, 113 and 115 and/or a reset of each of the power domains 111, 113 and 115 may be controlled independently. In addition, when a first interface block 117 is defined as an additional power domain, an additional control signal may be supplied to the first interface block 117. The additional control signal may be included in the first control signals CTR1.

The second CPU 120 includes power domains 121, 123, 125, 131, 133, 141 and 143. Each of second control signals CTR2-1 to CTR2-5 (collectively, 'CTR2') is supplied to each of the power domains 121, 125, 123, 131, and 141.

According to each of the second control signals CTR2-1 to CTR2-5, a power supplied to each of the corresponding power domains 121, 125, 123, 131, 133, and 141 and/or a reset of each of the power domains may be controlled independently.

In addition, when a second interface block 127 is defined as an additional power domain, an additional control signal may be supplied to the second interface block 127. The additional control signal may be included in the second control signals CTR2.

The domain of shared L2 cache portions 133 and 143 is independently controllable by control signals CTR3-1 and CTR3-2. According to an alternative embodiment, the CTR3-1 and CTR3-2 signals can be integrated with either CTR1 or CTR2.

Figure 4B:
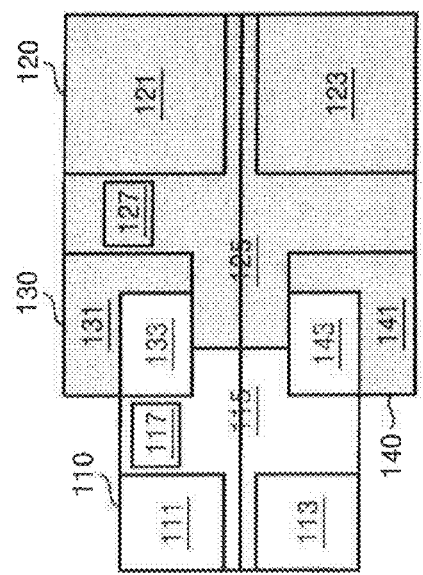
FIGS. 4A and 4B illustrate an example embodiment of CPU scaling of the multi-CPU of FIG. 1A.
Figure 4A:
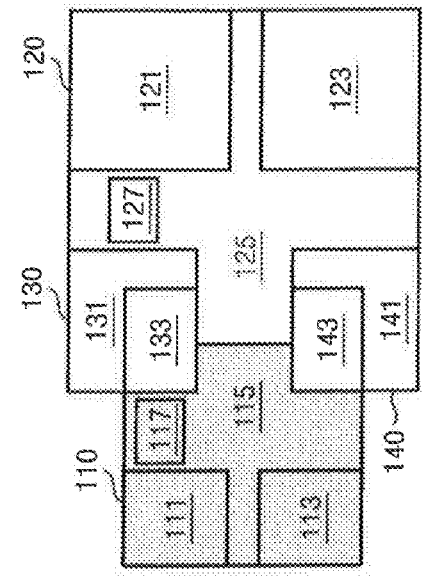

FIG. 4A and FIG. 4B show CPU scaling processes from a small CPU 110 to a big CPU 120 according to an embodiment of the present inventive concept.

In a multi-CPU data processing system having CPUs that are different in sizes and capabilities, peak performance may be achieved by scaling usage among the CPUs. For example, at a low workload, the small CPU 110 may be used as a power-driven CPU, operating at a highest millions of instructions per second per milliwatt (MIPS/mW) for optimized power usage. At a high workload, the big CPU 120 may be used as a performance-driven CPU, operating at peak performance even though it has lower MIPS/mW.

Here, CPU scaling means an operation of switching from the small CPU 110 to the big CPU 120 or from the big CPU 120 to the small CPU 110 at the same operating voltage. That is, the CPU scaling may change workload performance capability on power consumption, e.g., MIPS/mW, or change an amount of energy which is necessary for executing a CPU instruction without changing a voltage.

Referring to FIG. 4A, the small CPU 110 is shown in operation, with power domains 111, 113, and 115 (including 117 if needed) in a power on state POWER ON and each power domain 121 to 125, 131 and 141 (including 127 if needed) of the big CPU 120 is in a power off state POWER OFF. The power domains 133 and 143, serving the shared L2 cache, are also POWER ON. The first L2 cache controller 115 may access at least one shared region 133 and 143 through each selector 160 and 161.

When workload of the small CPU 110 increases, scaling to the big CPU 120 may be desired. To scale from the small CPU to the big CPU, a first core 111 of the first CPU 110 transmits a first indication signal IND1 to the PMU 150 through the first communication channel CH1 and the system bus 101 to perform CPU scaling or CPU switching from the small CPU 110 to the big CPU 120.

The PMU 150 outputs first control signals CTR1, second control signals CTR2 and a selection signal SEL in response to a first indication signal IND1. Accordingly, the power applied to each of the power domains 111, 113 and 115 is turned off in response to each of the first control signals CTR1 and the small CPU 110 halts the current job.

At the same time, the power applied to each of power domains 121, 123, 125, 131 and 141 of the big CPU 120 is turned on and the big CPU 120 commences operation for the job in response to each of second control signals CTR2-1 to CTR2-5.

At least one shared region 133 and 143 may be used as a subset of L2 cache 130 or 140 of the big CPU 120. The above-described scaling process from the small CPU 110 to the big CPU 120 does not require a snooping operation.

Moreover, the big CPU 120 need not perform a cold-start for either L2 cache 130 and 140. At least one dedicated region 131 and 141 of at least one L2 cache 130 and 140 may be in a READY state along with power domains 121, 123 and 125.

During CPU scaling from the small CPU 110 to the big CPU 120, power supplied to at least one shared region 133 and 143 is kept ON. In addition, during CPU scaling from the small CPU 110 to the big CPU 120, each selector 160 and 161 is switched so that the second L2 cache controller 125 may access at least one shared region 133 and 143 through each selector 160 and 161.

Accordingly, the structure including the big CPU 120 according to this embodiment of the inventive concept is configured for optimal performance immediately after CPU scaling or CPU switching.

As illustrated in FIG. 4B, right after CPU scaling from the small CPU 110 to the big CPU 120, each power domain of the small CPU 110 are in a power off state POWER OFF and each power domain 121 to 125, 131 and 141 of the big CPU 120 are in a power on state POWER ON. Power supplied to shared regions 133 and 143 is kept ON.

In the case of the multi-CPU system 100 not supporting a snooping operation, the small CPU 110 flushes data which is stored in at least one shared region 133 and 143 (e.g., data that does not include an error correction code (ECC)) to the memory 107 through channel CH1, bus 101 and memory controller 105. Thereafter, the big CPU 120 may read data stored in the memory 107 through memory controller 105, bus 101 and channel CH2. The big CPU may add an ECC to the read data, and store ECC-added data in at least one shared L2 cache portion 133 and 143.

Figure 5:
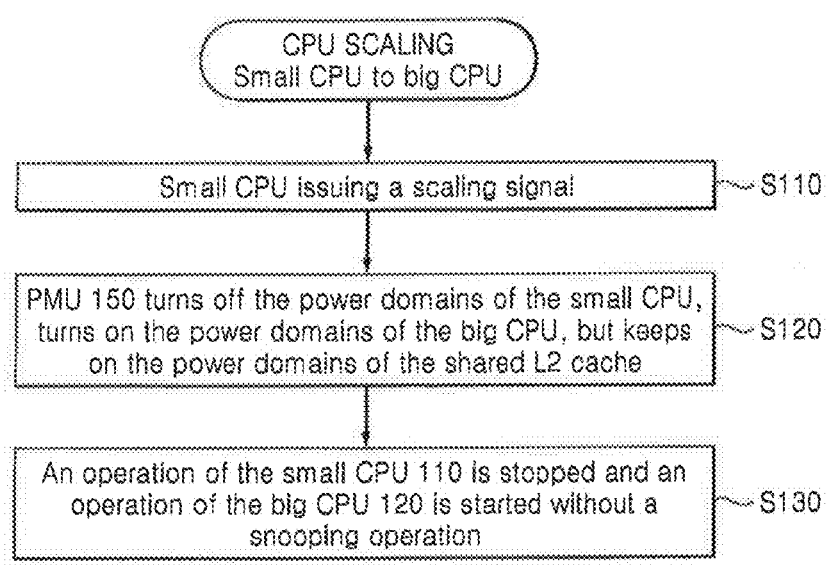
FIG. 5 is a flowchart of a CPU scaling process according to an example embodiment of the present inventive concept.

FIG. 5 is a flow diagram for explaining a CPU scaling process. Referring to FIGS. 1A to 5, CPU scaling from the small CPU 110 to the big CPU 120 is initiated by the small CPU 110 issuing a scaling signal IND1 (S110); the PMU 150 turns off the power domains of the small CPU 110, turns on the power domains of the big CPU 120, but keeps on the power domains of the shared L2 cache portions 133 and 143 (S120); and an operation of the small CPU 110 is stopped and an operation of the big CPU 120 is started without a snooping operation (S130).

According to an example embodiment, when the small CPU 110 transmits data stored in the at least one shared region 133 and 143 to the memory 107, the big CPU 120 may read out the data stored in the memory 107 when necessary.

FIG. 6A to FIG. 6D illustrate CPU scaling processes from the big CPU 120 to the small CPU 110.

Figure 6A:
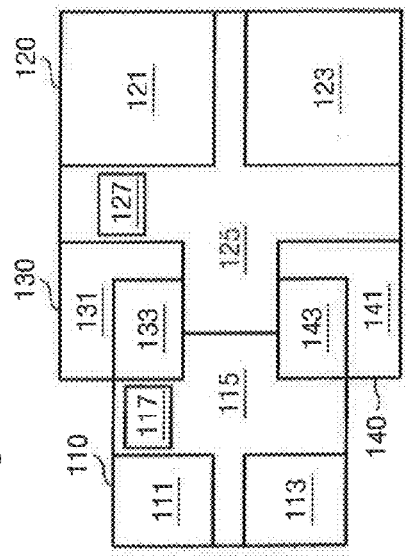
FIGS. 6A, 6B, 6C, and 6D illustrate another example embodiment of CPU scaling of the multi-CPU of FIG. 1A.

Referring to FIGS. 1A to 3 and 6A to 6D, when the big CPU 120 operates as illustrated in FIG. 6A, each power domain 111, 113 and 115 of the small CPU 110 is in a power off state POWER OFF, and each power domain 121, 123, 125, 131, 133, 141 and 143 of the big CPU 120 is in a power on state POWER ON. Here, the second L2 cache controller 125 may access either or both shared region 133 and 143.

For CPU scaling from the big CPU 120 to the small CPU 110, a first core 121 of the big CPU 120 outputs a second indication signal IND2 to the PMU 150 through a second communication channel CH2 and the system bus 101.

The PMU 150 outputs first control signals CTR1, second control signal CTR2 and a selection signal SEL in response to the second indication signal IND2.

Each selector 160 and 161 forms a communication channel between the at least one shared region 133 and 143 and the second L1 cache controller 115 in response to a selection signal SEL.

Figure 6B:
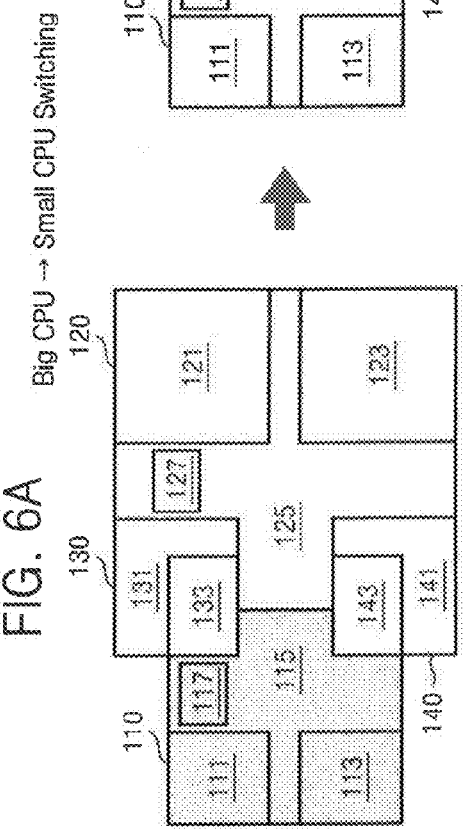

As illustrated in FIG. 6B, each power domain 111 to 115 of the small CPU 110 becomes in a power on state POWER ON in response to each of the first control signals CTR1, and each power domain 121 to 125, 130 and 140 of the big CPU 120 keeps in a power on state POWER ON in response to each of the second control signals CTR2. The power domains to the shared L2 cache portions 133 and 143 are kept on with third control signals CTR3.

Here, data of at least one of power domains 121 to 125 of the big CPU 120 are updated to at least one L2 cache 130 and 140, and the big CPU 120 performs a flushing operation on at least one dedicated region 131 and 141 while performing a snooping operation through a second communication channel CH2. Data from the flushing operation may be transmitted to the memory 107 through channel CH2, bus 101 and memory controller 105.

Figure 6C:
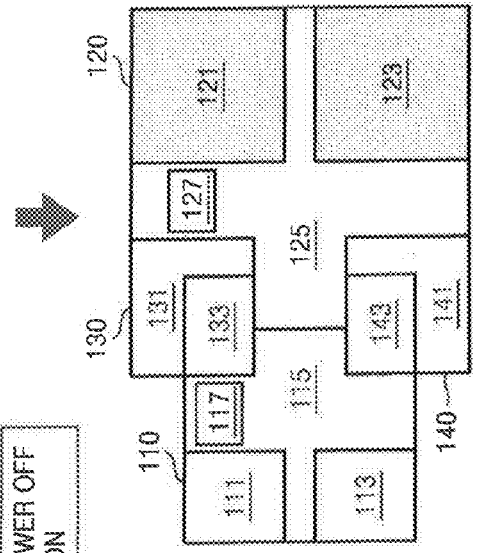

As illustrated in FIG. 6C, each power domain 121 and 123 of the big CPU 120 becomes in a power off state POWER OFF in response to each of corresponding control signals among the second control signals CTR2 while a flushing operation is performed.

Figure 6D:
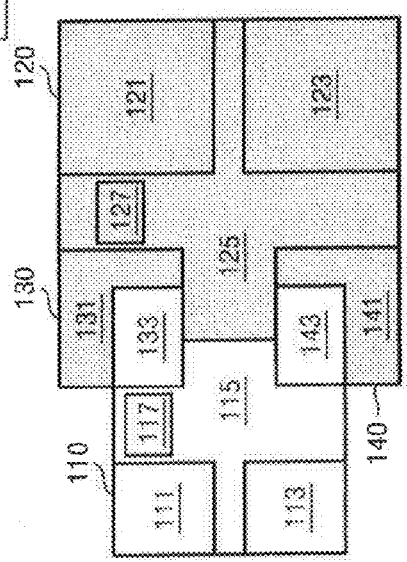

When the flushing operation is completed, each power domain 125, 131 and 141 of the big CPU 120 becomes in a power off POWER OFF in response to each of corresponding control signals among the second control signals CTR2 as illustrated in FIG. 6D. Accordingly, when CPU scaling is completed, the first L2 cache controller 115 of the small CPU 110 may access at least one shared region 133 and 143 through each selector 160 and 161.

As illustrated in FIG. 6A to FIG. 6D, the power supplied to the shared region 133 and 143 is kept on with control signals CTR3 during CPU scaling.

In addition, the at least one shared region 133 and 143 does not perform a snooping operation through the second communication channel CH2 during CPU scaling. That is, the at least one shared region 133 and 143 is shared physically by each CPU 110 and 120, so that a region where a snooping operation is performed decreases.

Figure 7:
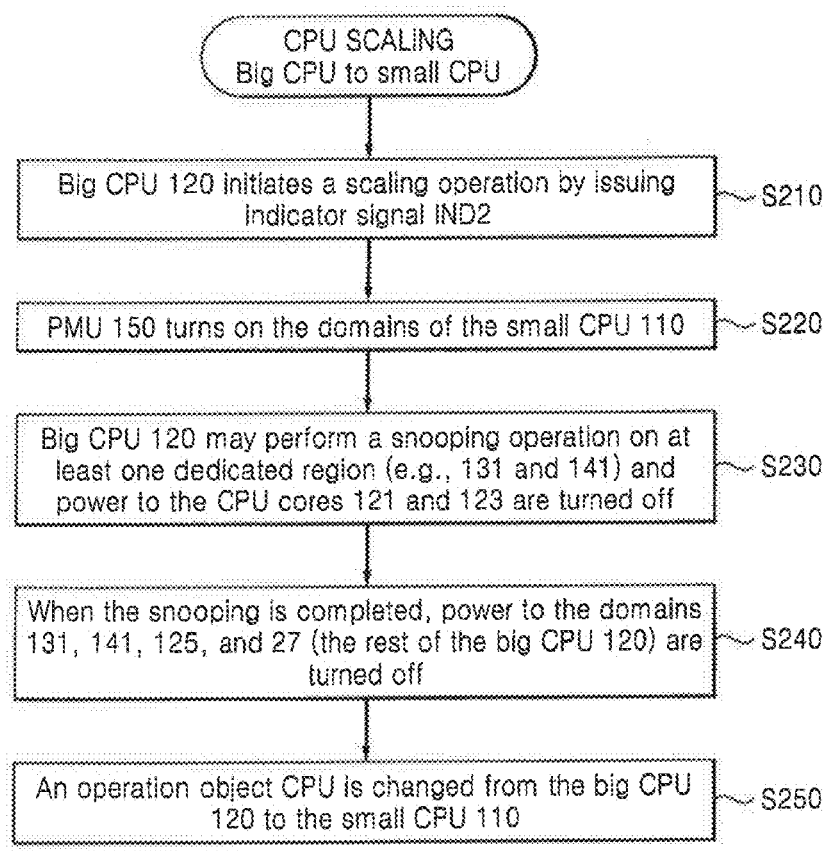
FIG. 7 is a flowchart of another CPU scaling process according to an example embodiment of the present inventive concept.

FIG. 7 is a flowchart for explaining the CPU scaling illustrated in FIG. 6. Referring to FIGS. 6 and 7, the big CPU 120 initiates a scaling operation by issuing indicator signal IND2 (S210); the PMU 150 turns on the domains of the small CPU 110 (S220); the big CPU 120 may perform a snooping operation only on at least one dedicated region 131 and 141 and power to the CPU cores 121 and 123 are turned off (S230); when the snooping is completed, power to the domains 131, 141, 125, and 27 (the rest of the big CPU 120) are turned off (S240); and an operation object CPU is changed from the big CPU 120 to the small CPU 110 (S250).

Figure 8:
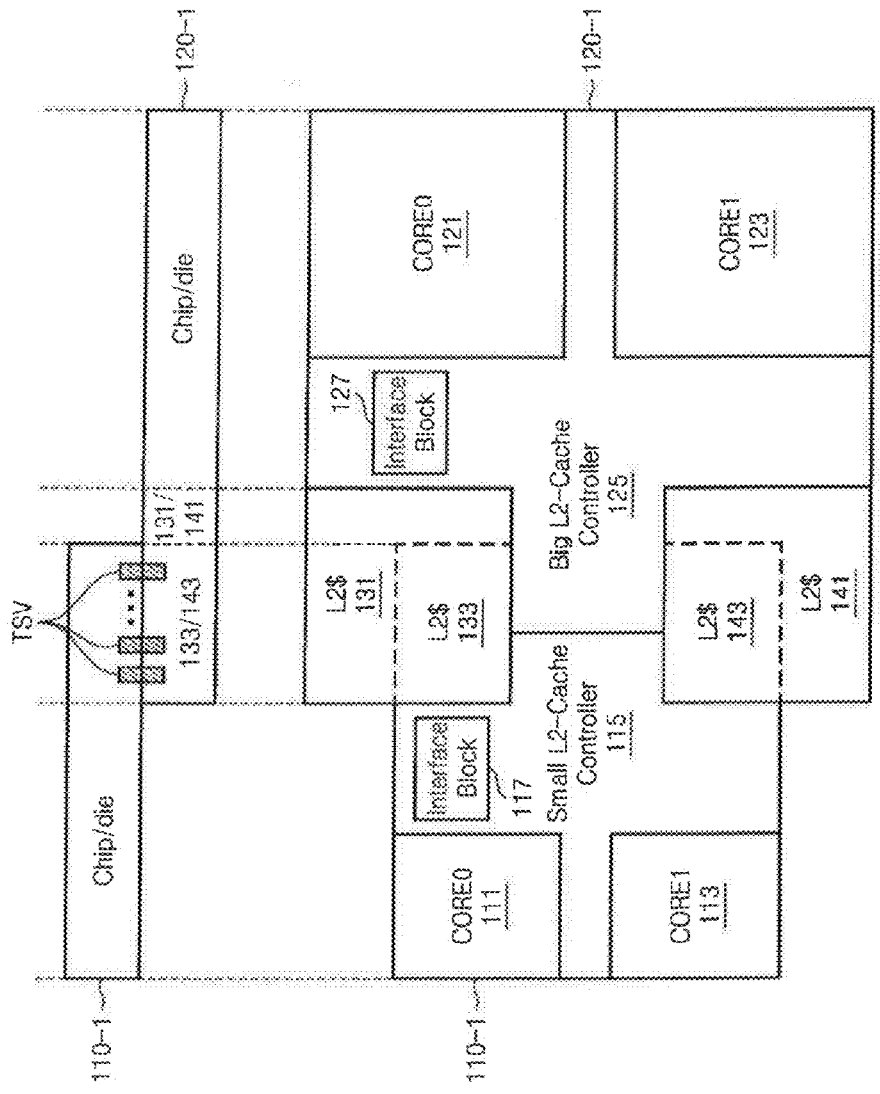
FIGS. 8A and 8B are a schematic block diagrams of a multi-CPU system according to another example embodiment of the present inventive concept.

FIG. 8 is a schematic block diagram of the multi-CPU system according to another example embodiment of the present inventive concept. Referring to FIG. 8, the multi-CPU system includes a first CPU 110-1 and a second CPU 120-1. FIG. 8A illustrates a front view of the multi-CPU system, and FIG. 8B illustrates a plan view of the multi-CPU system.

As illustrated in FIGS. 8A and 8B, the first CPU 110-1 is stacked on the second CPU 120-1.

The first CPU 110-1 and the second CPU 120-1 may be embodied in different chips or dies. The shared L2 cache region 133 and 143 is embodied in the second CPU 120-1. This shared region is accessible by the first CPU 110-1 through electrical vias, e.g., through silicon vias (TSVs). According to the present embodiment, the chip 110-1 that embodies the components of the small CPU 110 does not include its own L2 cache. Instead, the entire L2 cache 130 and 140 of the big CPU 120 is disposed in the chip 120-1, and a shared portion (133 and 143) of the L2 cache that is physically disposed in chip 120-1 is used by both the small CPU 110 and the big CPU 120.

A structure of the first CPU 110-1 includes the structure of the first CPU 110 of FIG. 1A, and the structure of the second CPU 120-1 includes the structure of the second CPU 120 of FIG. 1A. Here, a PMU corresponding to the PMU 150 of FIG. 1A may also be embodied in the second CPU 120-1. In such embodiment, control signals associated with the PMU, such as CTR1, may also be connected via one of the TSVs.

Figure 9:
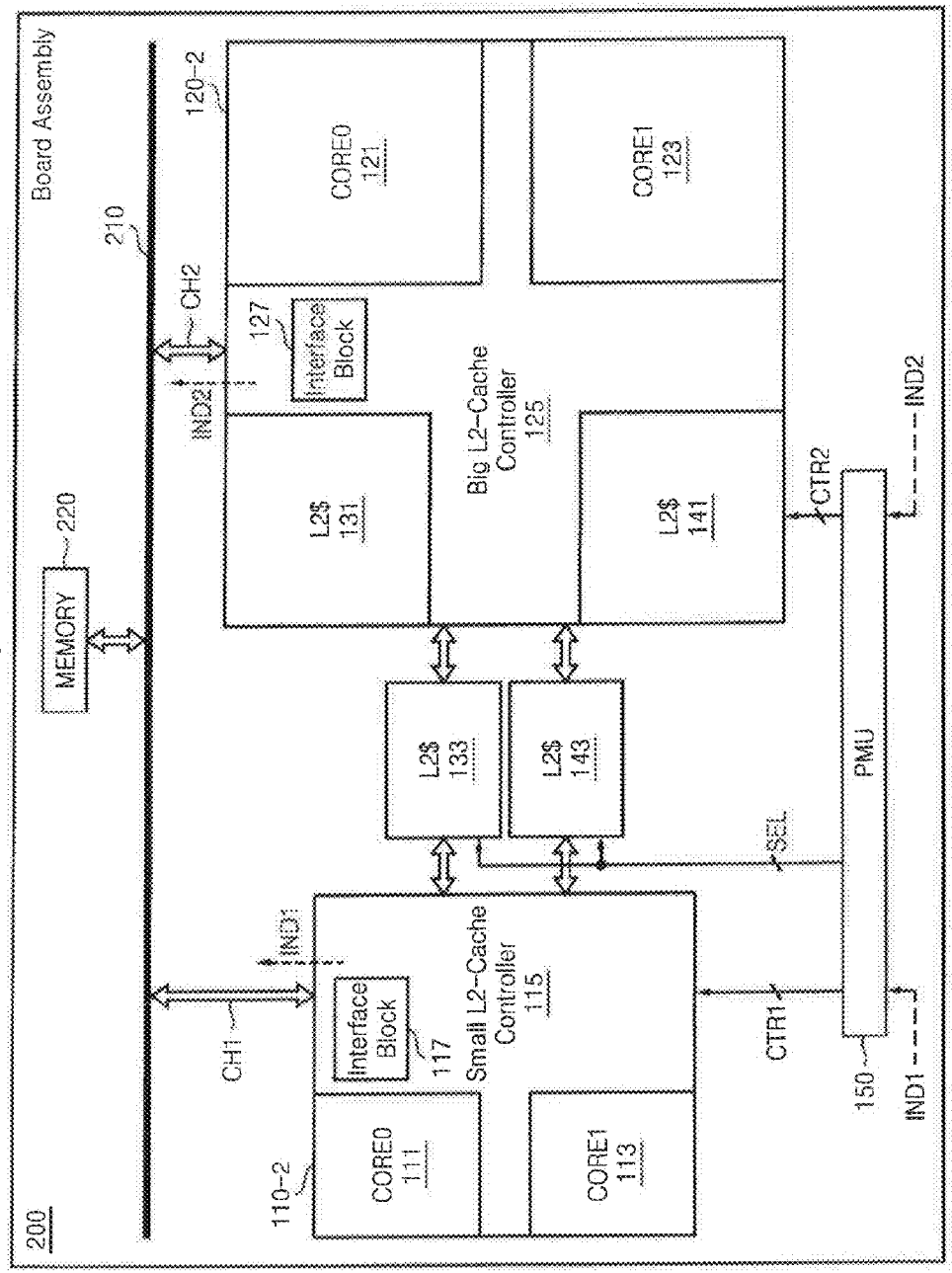
FIG. 9 is a block diagram of a board assembly according to an example embodiment of the present inventive concept.

FIG. 9 is a block diagram of a board assembly according to an example embodiment of the present inventive concept. Referring to FIG. 9, a board assembly 200 includes a first CPU 110-2, a second CPU 120-2, at least one shared region 133 and 143, the PMU 150, a bus 210 and a memory 220.

Referring to FIGS. 1A, 8A, 8B and 9, at least one shared region 133 and 143 may be embodied separately from the first CPU 110-2 and the second CPU 120-2.

Except for the at least one shared region 133 and 143, the first CPU 110 of FIG. 1A has substantially the same structure and operation as the first CPU 110-2 of FIG. 9, and the second CPU 120 of FIG. 1A has substantially the same structure and operation as the second CPU 120-2 of FIG. 9.

The first L2 cache controller 115 or a first interface block 117 may communicate with a bus 210 through a first communication channel CH1. The second L2 cache controller 125 or a second interface block 127 may communication with the bus 210 through a second communication channel CH2.

Each first communication channel CH1 and second communication channel CH2 may be embodied in an electrical communication channel or an optical communication channel. Each L2 cache controller 115 and 125 may selectively access the at least one shared region 133 and 143.

Figure 10:
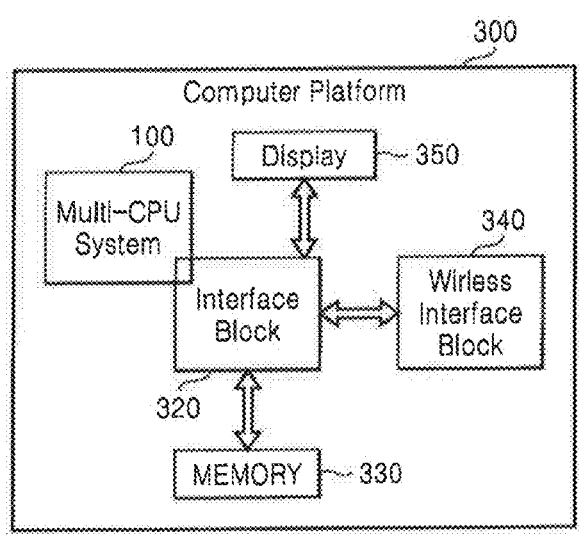
FIG. 10 is a computer platform according to an example embodiment of the present inventive concept.

FIG. 10 is a computer platform according to an example embodiment of the present inventive concept. Referring to FIG. 10, a computer platform 300 may be used in an electronic device like a computing system. The electronic device may be embodied in a personal computer (PC), a portable device, a mobile device, or a digital TV.

A portable device may be embodied in a laptop computer or a tablet PC. A mobile device may be embodied in a cellular phone, a smart phone, a, a personal digital assistant (PDA), an enterprise digital assistant (EDA), a digital still camera, a digital video camera, a portable multimedia player (PMP), a personal navigation device or portable navigation device (PND), a handheld game console or an e-book.

The computer platform 300 includes the multi-CPU system 100, an interface block 320 and a memory 330. According to an example embodiment, the computer platform 300 may further include at least one of a wireless interface block 340 and a display 350.

The multi-CPU system 100 may communicate with the memory 330, the wireless interface block 340 or the display 350 through the interface block 320.

The interface block 320 includes one or more circuit blocks which may perform various interface control functions. The control functions include a memory access control, a graphic control, an input/output interface control or a wireless network access control.

Each of the circuit blocks may be embodied in an additional independent chip, a part of the multi-CPU system 100, or inside the multi-CPU system 100.

The memory 330 may transmit or receive data with the multi-CPU system 100 through the interface block 320.

The wireless interface block 340 may connect the computer platform 300 to a wireless network, e.g., a mobile communication network or a wireless local area network (LAN), through an antenna.

Figure 11:
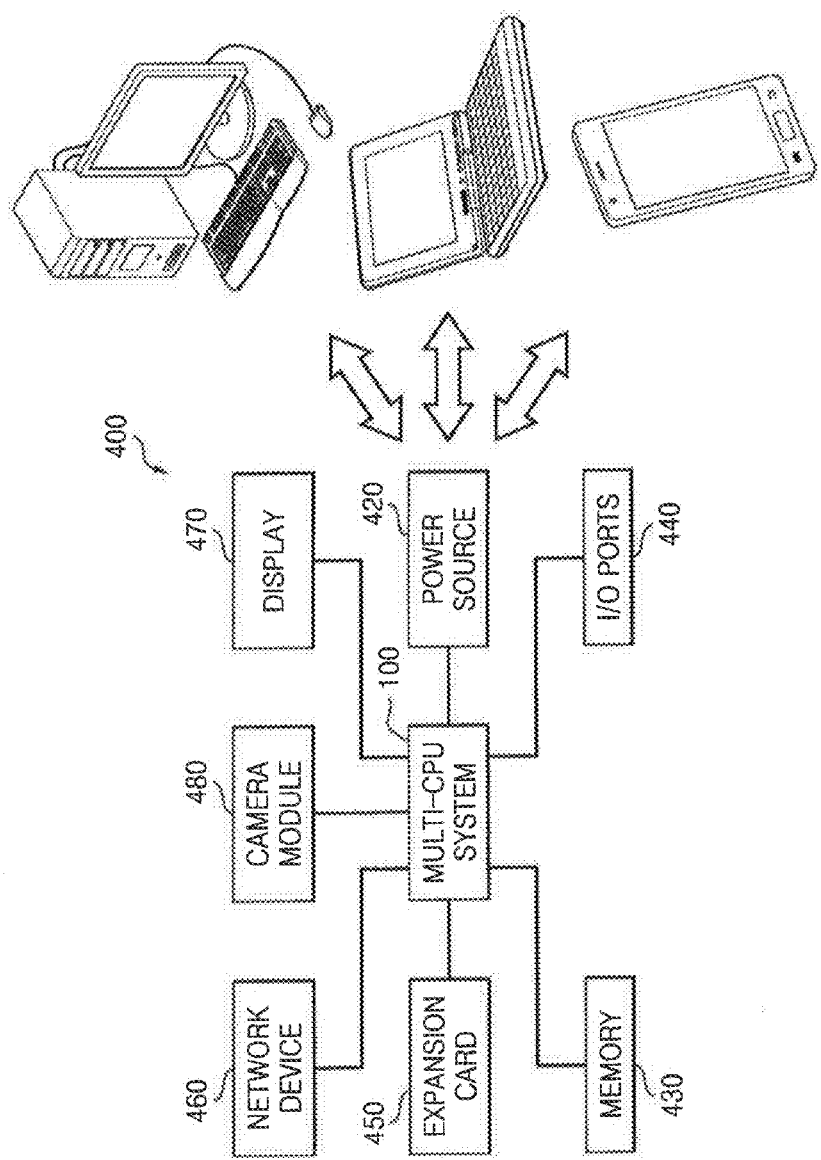
FIG. 11 is a computing system including a multi-CPU system according to an example embodiment of the present inventive concept.

FIG. 11 is an example embodiment of a computing system including a multi-CPU system according to an example embodiment of the present inventive concept. Referring to FIG. 11, a computing system 400 may be embodied in a PC, a data server, a laptop computer or a portable device.

The computing system 400 may include the multi-CPU system 100, a power source 420, the memory 430, input/output ports 440, an expansion card 450, a network device 460, and a display 470. According to an example embodiment, the computing system 400 may further include a camera module 480.

The multi-CPU system 100 may control an operation of at least one of elements 420 to 480. The power source 420 may supply an operation voltage to at least one of elements 103 and 430 to 480.

The memory 430 may be embodied in a volatile memory or a non-volatile memory. According to an example embodiment, a memory controller which may control a data access operation for the memory 430, e.g., a read operation, a write operation (or a program operation), or an erase operation, may be integrated or built in the multi-CPU system 100. According to another example embodiment, the memory controller may be embodied additionally between the multi-CPU system 100 and the memory 430.

The input/output ports 440 mean ports which may transmit data to the computing system 400 or transmit data output from the computing system 400 to an external device.

For example, the input/output ports 440 may include at least one of a port for connecting a pointing device like a computer mouse, a port for connecting a printer and a port for connecting a USB drive.

The expansion card 450 may be embodied in a secure digital (SD) card or a multimedia card (MMC). According to an example embodiment, the expansion card 450 may be a Subscriber Identification Module (SIM) card or a Universal Subscriber Identity Module (USIM) card.

The network device 460 may mean a device which may connect the computing system 400 to a wire network or a wireless network. The display 470 may display data output from the memory 430, the input/output ports 440, the expansion card 450 or the network device 460.

The camera module 480 means a module which may convert an optical image into an electrical image. Accordingly, an electrical image output from the camera module 480 may be stored in the memory 430 or the expansion card 450. Additionally, an electrical image output from the camera module 480 may be displayed through the display 470 according to a control of the multi-CPU system 100.

The multi-CPU system 100 is illustrated as an element of each computing system 300 or 400 in FIGS. 10 and 11; however, the multi-CPU system 100 may be replaced with a multi-CPU 103 or a board assembly 200 according to an example embodiment. In this case, a structure of each computing system 300 or 400 may be changed suitably for the multi-CPU 103 or the board assembly 200.

Figure 12:
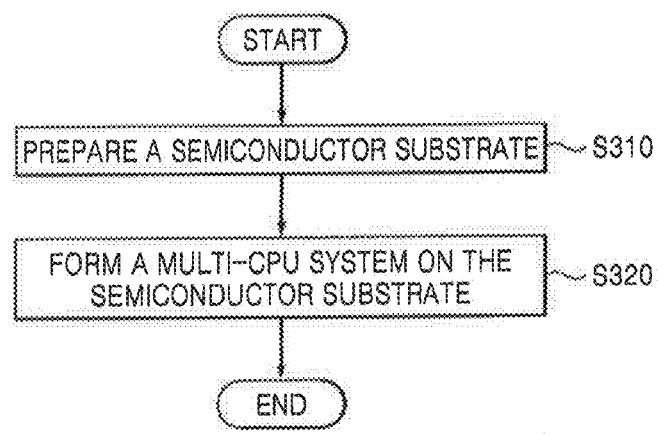
FIG. 12 is a flowchart of a method of manufacturing the multi-CPU system according to an example embodiment of the present inventive concept.

FIG. 12 is a flowchart for explaining a method of manufacturing the multi-CPU system according to an example embodiment of the present inventive concepts. Referring to FIGS. 1A and 12, a semiconductor substrate is prepared (S310). The first CPU 110, which includes the first L2 cache controller 115 connected to at least one first CPU cores 111 and 1B, and the second CPU 120, which include the second L2 cache controller 125 connected to at least one of second CPU core 121 and 123, are formed on the semiconductor substrate (S320).

In an overlap region 133 and 143 between the first CPU 110 and the second CPU 120, a shared L2 cache which may be accessed selectively by the first L2 cache controller 115 and the second L2 cache controller 125 is formed.

On the semiconductor substrate, a system bus 101, a first communication channel CH1 between the system bus 101 and the first cache controller 115, and a second communication channel CH2 between the system bus 101 and the second cache controller 125 are formed. According to an example embodiment, a step of S310 and a step of S320 may be embodied at the same time or at different time.

As illustrated in FIG. 8, after the first CPU 110-1 and the second CPU 120-1 are formed in different chips or dies, they may be connected to each other through vertical electrical vias (TSV) so that shared components such as shared region of L2 cache portions 133 and 143.

The sharing of an L2 cache according to an example embodiment of the present inventive concept reduces the physical size of the multi-CPU system; reduces overhead of a snooping operation; and eliminates cold-start of the L2 cache.

Although embodiments of the present inventive concept have been shown and described, it will be appreciated by those skilled in the art that changes may be made in these embodiments without departing from the principles and spirit of the general inventive concept, the scope of which is defined in the appended claims and their equivalents.

We claim:

1. A multi-CPU processor comprising:
   a first multi-core CPU including a first core, a second core and a first cache controller connected in signal communication to the first and second cores;
   a second multi-core CPU including a third core, a fourth core and a second cache controller connected in signal communication to the third and fourth cores; and
   an L2 cache including a first area and a second area:
   wherein the first area includes a shared first portion and a dedicated second portion, the first cache controller connected in signal communication to the shared first portion and the second cache controller connected in signal communication to the shared first portion and the dedicated second portion,
   wherein the second area includes a shared third portion and a dedicated fourth portion,
   the first cache controller is connected in signal communication to the shared third portion and the second cache controller is connected in signal communication to the shared third portion and the dedicated fourth portion,
   the first multi-core CPU includes the shared first portion and the shared third portion,
   the second multi-core CPU includes the L2 cache including the shared first portion, the dedicated second portion, the shared third portion and the dedicated fourth portion,
   the shared first portion and the shared third portion are shared physically by the first multi-core CPU and the second multi-core CPU,
   the first cache controller is configured to control access to the shared first portion and the shared third portion,
   the second cache controller is configured to control access to the shared first portion and the dedicated second portion, the shared third portion, and the dedicated fourth portion, and
   power supplied to each of the first core, the second core, the third core, the fourth core, the shared first portion, the dedicated second portion, the shared third portion and the dedicated fourth portion is controlled independently to facilitate CPU scaling from the first multi-core CPU to the second multi-core CPU.

2. The multi-CPU processor of claim 1, wherein both the first multi-core CPU and the second multi-core CPU are embodied in a first die.

3. The multi-CPU processor of claim 1, wherein the first core, the second core, the first portion and the third portion are embodied in a first die, and
   the third core, the fourth core, the second portion and the fourth portion are embodied in a second die.

4. The multi-CPU processor of claim 1, wherein the first core and the second core are embodied in a first die, and
   the third core, the fourth core, the first portion and the second portion, and the third portion and the fourth portion are embodied in a second die.

5. The mufti-CPU processor of claim 1, wherein when the first core, the second core and the third core are in a power on state and the fourth core is in a power off state, the fourth portion of the second cache is in the power off state and the first portion, the second portion, and the third portion are in the power on state.

6. The mufti-CPU processor of claim 1, wherein when the first core and the third core are in a power on state and the third core and the fourth core are in a power off state, the second portion and the fourth portion are in the power off state and the first portion and the third portion are in the power on state.

7. The mufti-CPU processor of claim 1, wherein a cache access operation is switched from the third core to the first core, without flushing of the second portion.

8. A multi-CPU processor comprising:
   a first CPU including a first core and a first cache controller connected in signal communication to the first core;
   a second CPU including a second core and a second cache controller connected in signal communication to the second core; and
   an L2 cache including a first area and a second area,
   wherein the first area includes a shared first portion connected in signal communication to the first and second cache controllers, and a dedicated second portion is connected in signal communication to the second cache controller,
   wherein the first CPU includes the shared first portion,
   the second CPU includes the shared first portion and the dedicated second portion,
   the shared first portion is shared physically by the first CPU and the second CPU,
   the first cache controller is configured to control access to the shared first portion,
   the second cache controller is configured to control access to the shared first portion and the dedicated second portion,
   power supplied to each of the first core, the second core, the shared first portion and the dedicated second portion is controlled independently, and
   CPU scaling from the first CPU to the second CPU, wherein a cache access operation is switched between the second cache controller and the first cache controller without flushing the second portion.

9. The multi-CPU processor of claim 8, further comprising a multiplexer configured to pass data to the first portion, either from the first core or from the second core.

10. The mufti-CPU processor of claim 8, further comprising a demultiplexer configured to pass data from the first portion, either to the first core or to the second core.

11. The multi-CPU processor of claim 8, further comprising a power management unit configured to selectively supply the power to the first core, the second core, the first portion and the second portion.

12. The multi-CPU processor of claim 8, wherein the first portion is embodied in a first system on chip (SoC), and the first core is embodied in a second SoC.

13. The multi-CPU processor of claim 8, wherein both the first portion of the cache and the first core are embodied in a first system on chip (SoC).

14. The multi-CPU processor of claim 8, wherein the first core is embodied in a first power domain,
the second core is embodied in a second power domain,
the first portion of the cache is embodied in a third power domain, and
each of the first, second and third power domains is independently controlled.

15. A multi-CPU processor comprising:
a first CPU including a first core and a first cache controller connected in signal communication to the first core;
a second CPU including a second core and a second cache controller connected in signal communication to the second core, a size of the second core being larger than a size of the first core; and
an L2 cache including a shared first portion connected in signal communication to the first and second cache controllers, and a dedicated second portion connected in signal communication to the second cache controller,
wherein the first CPU includes the shared first portion of the L2 cache,
the second CPU includes the shared first portion and the dedicated second portion of the L2 cache,
the shared first portion of the L2 cache is shared physically by the first CPU and the second CPU,
the first cache controller is configured to control access to the shared first portion of the L2 cache,
the second cache controller is configured to control access to the shared first portion and the dedicated second portion of the L2 cache,
power supplied to each of the first core, the second core, the shared first portion of the L2 cache and the dedicated second portion of the L2 cache is controlled independently, based on workload, and
CPU scaling from the first CPU to the second CPU, wherein a cache access operation is switched between the first cache controller and the second cache controller based on the workload.

16. The multi-CPU processor of claim 15, wherein when the workload decreases, the cache access operation is switched from the second core to the first core, without snooping of the second portion of L2 cache.

17. The multi-CPU processor of claim 15, wherein when the workload increases, the cache access operation is switched from the first core to the second core.

18. The multi-CPU processor of claim 15, wherein when the first core is in a power on state and the second core is in a power off state, the second portion of the L2 cache is in the power off state and the first portion of the L2 cache is in the power on state.

19. The multi-CPU processor of claim 15, further comprising a power management unit configured to selectively supply the power to the first core, the second core, the first portion of the L2 cache and the second portion of the L2 cache.

20. The multi-CPU processor of claim 15, wherein the first core and the first portion of the L2 cache are embodied in a first die, and
the second core and the second portion of the L2 cache are embodied in a second die.

* * * * *